US012698972B2

(12) United States Patent
Urano et al.

(10) Patent No.: US 12,698,972 B2
(45) Date of Patent: Aug. 4, 2026

(54) REMOTE SUPPORT METHOD AND REMOTE SUPPORT SYSTEM

(71) Applicant: TOYOTA JIDOSHA KABUSHIKI KAISHA, Toyota (JP)

(72) Inventors: Hiromitsu Urano, Numazu (JP); Masamichi Ohsugi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 18/774,140

(22) Filed: Jul. 16, 2024

(65) Prior Publication Data

US 2025/0027778 A1    Jan. 23, 2025

(30) Foreign Application Priority Data

Jul. 18, 2023    (JP) ................................. 2023-117127

(51) Int. Cl.
*G01C 21/34*            (2006.01)

(52) U.S. Cl.
CPC ..... *G01C 21/3415* (2013.01); *G01C 21/3492* (2013.01)

(58) Field of Classification Search
CPC ............ G01C 21/3415; G01C 21/3492; G01C 21/3461; G08G 1/096811; G08G 1/096833
See application file for complete search history.

(56) References Cited

U.S. PATENT DOCUMENTS

| | | | | |
|---|---|---|---|---|
| 10,192,448 | B2 * | 1/2019 | Moreira-Matias | ..... G08G 1/202 |
| 10,691,138 | B2 * | 6/2020 | Antunes Marques Esteves | .......... B60L 53/00 |
| 10,812,996 | B2 * | 10/2020 | Tavares Coutinho | .. H04L 67/52 |
| 11,062,415 | B2 * | 7/2021 | Scicluna | ................ G06Q 10/02 |
| 11,562,300 | B2 * | 1/2023 | Tulabandhula | .... G01C 21/3423 |
| 11,823,118 | B1 * | 11/2023 | Cao | .................... G06Q 10/0832 |
| 12,292,294 | B2 * | 5/2025 | Suzuki | ............ G08G 1/096866 |
| 2011/0231354 | A1 * | 9/2011 | O'Sullivan | .......... G08G 1/0104 706/46 |
| 2015/0293701 | A1 * | 10/2015 | Kim | ...................... G06F 3/0652 711/159 |
| 2021/0155269 | A1 * | 5/2021 | Oba | ................. G08G 1/096775 |
| 2022/0196416 | A1 | 6/2022 | Suzuki et al. | |
| 2022/0327483 | A1 * | 10/2022 | Yang | ................... G01C 21/3605 |

(Continued)

FOREIGN PATENT DOCUMENTS

| | | | | | |
|---|---|---|---|---|---|
| EP | 3913597 | A1 * | 11/2021 | ....... | G08G 1/096811 |
| JP | 6551127 | B2 | 7/2019 | | |

(Continued)

*Primary Examiner* — Redhwan K Mawari
*Assistant Examiner* — Kai Wang
(74) *Attorney, Agent, or Firm* — Dinsmore & Shohl LLP

(57) ABSTRACT

A processing load of a server configured to manage a remote support or data traffic per unit time in sending/receiving between a target mobile vehicle of the remote support and the server is calculated. Positional information of a current location and a destination of the target mobile vehicle and map information containing the current location and the destination are obtained. When the processing load is equal to or greater than an upper limit load or when the data traffic per unit time is equal to or greater than an upper limit amount, a proposal is made to the target mobile vehicle for an avoidance route for avoiding an occurrence of the remote support based on the positional information and the map information.

3 Claims, 5 Drawing Sheets

(56)            References Cited

U.S. PATENT DOCUMENTS

| | | | |
|---|---|---|---|
| 2023/0010007 A1* | 1/2023 | Wang ................ | B60W 60/0053 |
| 2023/0017970 A1* | 1/2023 | Oba ................... | G01C 21/3626 |

FOREIGN PATENT DOCUMENTS

| | | | |
|---|---|---|---|
| JP | 2020-159866 A | 10/2020 | |
| JP | 7211490 B2 | 1/2023 | |

* cited by examiner

REMOTE SUPPORT METHOD AND REMOTE SUPPORT SYSTEM

CROSS-REFERENCE TO RELATED APPLICATION

The present application claims priority under 35 U.S.C. § 119 to Japanese Patent Application No. 2023-117127, filed on Jul. 18, 2023, the contents of which application are incorporated herein by reference in their entirety.

TECHNICAL FIELD

The present disclosure relates to a method and system for providing remote support for a mobile vehicle.

BACKGROUND

JP7211490B discloses a method for managing a traveling route of a mobile vehicle used for a vehicle dispatching service. In this related art, the mobile vehicle is configured to be switchable between an autonomous driving mode and a manual driving mode. In the related art, when setting the traveling route of the mobile vehicle having such a configuration, history information of a position where a switching from the autonomous driving mode to the manual driving mode has occurred is acquired. Then, the traveling route that avoids the position where the switching has occurred is set based on the history information. Therefore, according to the related art, it is possible to set the traveling route in which the switching from the autonomous driving mode to the manual driving mode is unlikely to occur, that is, the traveling route with high traveling reliability only in the autonomous driving mode. This makes it possible to reduce a monitoring load on a system that manages the vehicle dispatch service.

Examples of documents indicating a technical level of the art relevant to the present disclosure include JP2020159866A and JP6551127B, in addition to JP7211490B.

Consider a service that provides a remote support for a plurality of mobile vehicles. In this service, when the remote support is executed intensively in a short time, it is expected that a processing load of a system for managing the service becomes enormous. In order to withstand the enormous processing load, it is necessary to invest in infrastructure, for example, to increase the number of processing devices constituting the system to increase the robustness, or to broaden the network line between the system and the plurality of mobile vehicles. However, such an infrastructure investment is expected to be a burden on a business operator who provides the service.

In addition, when data traffic increases due to the concentration of the remote support, it is assumed that traffic cost increases. However, such an increase in the traffic cost is also expected to be a burden on the business operator who provides the service.

A part of the infrastructure investment cost and the traffic cost can be transferred to a user of the service. However, this may prevent users from using the service. Therefore, it is desired to develop a technology for allowing the business operator to appropriately operate the remote support service while suppressing an excessive load on the business operator.

An object of the present disclosure is to provide a technique for preventing a business operator who provides a remote support service from being burdened excessively and allowing the business operator to operate the service appropriately.

SUMMARY

A first aspect of the present disclosure is a method for providing a remote support for a plurality of mobile vehicles and has the following features.

The method comprising: calculating a processing load of a server managing the remote support or data traffic per unit time in data sending/receiving between a target mobile vehicle of the remote support and the server; acquiring positional information on a current location and a destination of the target mobile vehicle and map information containing the current location and the destination; and when the processing load is greater than or equal to an upper limit load or when the data traffic per unit time is greater than or equal to an upper limit amount, making a proposal to the target mobile vehicle for an avoidance route for avoiding an occurrence of the remote support based on the positional information and the map information.

A second aspect of the present disclosure is a system for providing a remote support for a plurality of mobile vehicles and has the following features.

The system comprises a server for managing the remote support. The server is configured to execute: processing to calculate a processing load of the server or data traffic per unit time in data sending/receiving between a target mobile vehicle of the remote support and the server; processing to acquire positional information on a current location and a destination of the target mobile vehicle and map information containing the current location and the destination; and processing to make a proposal to the target mobile vehicle for an avoidance route for avoiding an occurrence of the remote support based on the positional information and the map information when the processing load is greater than or equal to an upper limit load or when the data traffic per unit time is greater than or equal to an upper limit amount.

According to the present disclosure, when the processing load of the server is equal to or greater than the upper limit load, the proposal regarding the avoidance route for avoiding the occurrence of the remote support is made to the target mobile vehicle. Therefore, when the target mobile vehicle accepts this proposal, it is possible to suppress the processing load of the server from becoming enormous. According to the present disclosure, when the data traffic per unit time in data sending/receiving between the target mobile vehicle of the remote support and the server is equal to or greater than the upper limit amount, the proposal regarding the avoidance route for avoiding the occurrence of the remote support is made. Therefore, when the target mobile vehicle accepts this proposal, the data traffic per unit time can be reduced to suppress the increase in the traffic cost. Therefore, according to the present disclosure, it is possible to prevent the burden on the business operator who provides the remote support service from becoming excessive, and to allow the business operator to appropriately operate the service.

DESCRIPTION OF EMBODIMENT

Figure 1:
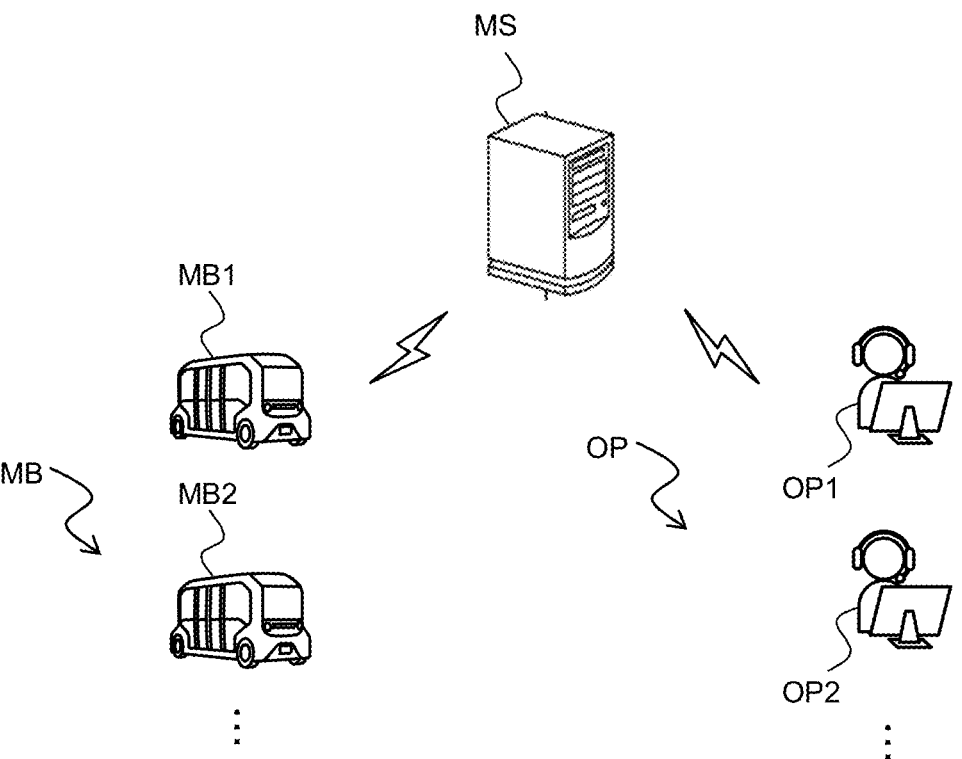
FIG. 1 is a conceptual diagram illustrating a remote service.

A remote support method and a remote support system according to an embodiment of the present disclosure will be described below with reference to the drawings. The method according to the embodiment is implemented by computer processing performed in the system according to the embodiment. In the drawings, the same or corresponding parts are denoted by the same reference numerals, and the description thereof will be simplified or omitted.

1. Remote Support

FIG. 1 is a conceptual diagram illustrating a remote support for a mobile vehicle. In FIG. 1, a management server MS, mobile vehicles MB1 and MB2, and operators OP1 and OP2 are depicted.

The management server MS manages a service for performing remote support (hereinafter, also referred to as a "remote service"). The management server MS is typically managed by a business operator of the remote service. The management server MS communicates with a plurality of mobile vehicle MBs and a plurality of operator OPs.

The mobile vehicles MB1 and MB2 are examples of the "plurality of mobile vehicle MBs" of the present disclosure. Each of the plurality of mobile vehicle MBs is a target to be provided with the remote service. A part or all of the plurality of mobile vehicle MBs may be a mobile vehicle owned by the business operator of the remote service, or may be a mobile vehicle owned by a corporation or an individual who has made a contract for providing the remote service with the business operator. The total number of the plurality of mobile vehicle MBs (hereinafter, also simply referred to as a "mobile vehicle MB") is M (M≥2). The configuration of the mobile vehicle MB is not particularly limited, but it is desirable that the mobile vehicle MB has a configuration capable of autonomous driving.

The operators OP1 and OP2 perform a service business SB for the target to which the remote service is provided. The plurality of operator OPs including the operators OP1 and OP2 may be employees of the business operator that provides the remote service, or may be employees of the corporation or individuals who have concluded the contract for outsourcing business with the business operator. The total headcount of the plurality of operator OPs (hereinafter, also simply referred to as an "operator OP") is N (N≥2). Examples of the service operation SB include a remote monitoring, a remote assistance, and a remote driving.

The remote monitoring includes monitoring by the operator OP of a communication state of the target of the remote monitoring, driving environment of the target, a state of the target, and a state of an occupant of the target. The remote assistance includes a proposal by the operator OP for facilitating a continuation of a travel of the target of the remote assistance when the target encounters a situation that cannot be handled by the target. The remote driving includes an execution of a dynamic motion task of the target of the remote driving and/or an execution of a fallback of the dynamic motion task by the operator OP.

2. Configuration Example of Management Server

Figure 2:
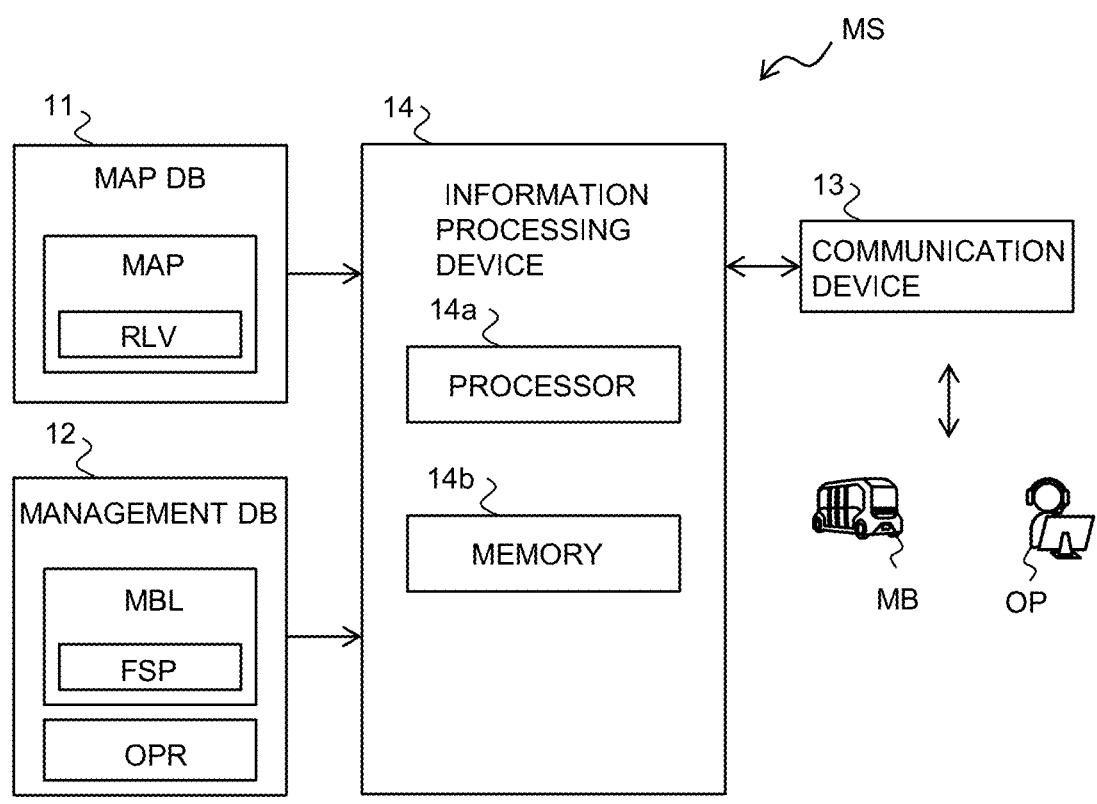
FIG. 2 is a diagram showing an example of an image output from a display of a terminal operated by an operator.

FIG. 2 is a diagram illustrating a configuration example of the management server MS. In the example shown in FIG. 2, the management server MS includes a map database (DB) 11, a management DB 12, a communication device 13, and an information processing device 14.

The map DB 11 is formed in a predetermined memory device (e.g., a nonvolatile recording media such as a hard disk, a flash memory, or the like). The map DB 11 stores map information MAP. The map information MAP includes information on respective positions of roads, information on respective shapes of the roads (e.g., a type of a curve or a straight line), and information on respective positions of intersections and constructions.

The map information MAP also includes information on an occurrence level RLV of the remote support. The occurrence level RLV represents a frequency of the occurrence of the remote support. The occurrence level RLV is set in advance for each zone formed by dividing the map. The occurrence level RLV is set, for example, based on the provision history of the remote support (specifically, the remote assistance or the remote driving). For example, according to the history of the position where the remote support is implemented, the number of times of implementing the remote support can be calculated. The frequency of the occurrence of the remote support can be obtained by calculating the number of times of executing the remote support per unit time. By dividing these frequencies into a plurality of levels, the occurrence level RLV can be set for each zone. The number of times of executing the remote support may be obtained by using a temporal factor such as a day of the week (weekday, holiday, or the like) or a time zone (morning, afternoon, or night).

In another example, the occurrence level RLV is set for each zone by using a prediction model in which the position of the road, the shape of the road, the presence or absence of the intersection, the presence or absence of a blind spot due to the construction, and the like are variables. In another example, the occurrence level RLV may be set by using the above-described temporal factor.

The management DB 12 is formed in a predetermined memory device, similarly to the map DB 11. The management DB 12 stores mobile vehicle information MBL. The mobile vehicle information MBL is information for identifying the mobile vehicle MB. The mobile vehicle information MBL includes various information on the mobile vehicle MB, such as positional information of the mobile vehicle MB, movement plan information of the mobile vehicle MBs, and state information of the mobile vehicle MB. The positional information and the movement plan information are acquired by a communication with the mobile vehicle MB. The movement plan information includes information on the destination of the mobile vehicle MB and information on a current route CRT of the mobile vehicle MB. The state information includes information on a current provision status (the remote monitoring, the remote assistance, or the remote driving is being provided or not provided) of the remote service by the management server MS.

The mobile vehicle information MBL also includes information on a free space FSP of a memory device of the mobile vehicle MB in which log information on the remote support is stored. Examples of the log information include external information (e.g., image information around the mobile vehicle MB) and internal information (e.g., information such as speed, acceleration, and steering angle of the mobile vehicle MB) sent from the mobile vehicle MB to the management server MS when an event in which the mobile vehicle MB is provided with the remote support (specifically, the remote assistance or the remote driving) occurs. The log information also includes instruction information received by the mobile vehicle MB from the management server MS during the event in which the mobile vehicle MB is provided with the remote support, and control amount information of driving devices (a driving device, a braking device and a steering device) of the mobile vehicle MB based on the instruction information.

The management DB 12 also stores operator information OPR. The operator information OPR is information for identifying the operator OP. The operator information OPR includes various information related to the operator OP such as qualification information, schedule information, and state information of the operator OP. The qualification information indicates a classification (e.g., large, medium, semi-medium, and normal) of an operation license of the operator OP. The schedule information indicates a schedule of the operator OP in a certain period (e.g., from the next day to a day one month later). The state information indicates the remote service (remote monitoring, remote assistance, or remote driving) in which the operator currently engages.

The communication device 13 is connected to an external device via a communication network. The communication network is not particularly limited, and a wired or wireless network can be used. Examples of the communication network include the Internet, the World Wide Web (WWW), a telephone line, a local area network (LAN), a storage area network (SAN), and a delay tolerant network (DTN). Examples of the wireless communication include Wireless Fidelity (Wi-Fi) and the Blue tooth (registered trademark). The wireless communication may be a form (ad hoc communication) in which the management server MS directly communicates or may be indirect communication via an access point. The communication destination of the communication device 13 includes a terminal of the mobile vehicle MB and a terminal of the operator OP.

The information processing device 14 is a computer that executes various types of information processing. The information processing device 14 includes at least one processor 14a and at least one memory 14b. The processor 14a includes a central processing unit (CPU). The memory 14b is a volatile memory such as a DDR memory, and develops various programs used by the processor 14a and temporarily stores various information.

The processor 14a executes programs stored in the memory 14b to execute processing related to the remote support such as a management of the mobile vehicle MB and a management of the operator OP. The processing related to the remote support includes processing to set the occurrence level RLV described above. The processing to set the occurrence level RLV includes processing to set an occurrence level RLV_A of the remote assistance and processing to set an occurrence level RLV_D of the remote driving. The processing related to the remote support includes processing to make a proposal of a traveling route (hereinafter, also referred to as an "avoidance route") ART for avoiding the occurrence of at least one of the remote assistance and the remote driving. This proposal processing will be described later.

3. Avoidance Route Proposal Processing

As described above, in the remote service, when the remote support is intensively performed in a short time, a processing load of the processor 14a becomes enormous, and the traffic cost is expected to increase. Therefore, in the embodiment, the processing load of the processor 14a is calculated. In addition, data traffic per unit time in data sending/receiving between the mobile vehicle MB and the management server MS is calculated. Then, when the processing load is equal to or greater than an upper limit load or when the data traffic per unit time is equal to or greater than an upper limit amount, the avoidance route ART is generated. The generated avoidance route ART is transmitted to the mobile vehicle MB.

Figure 3:
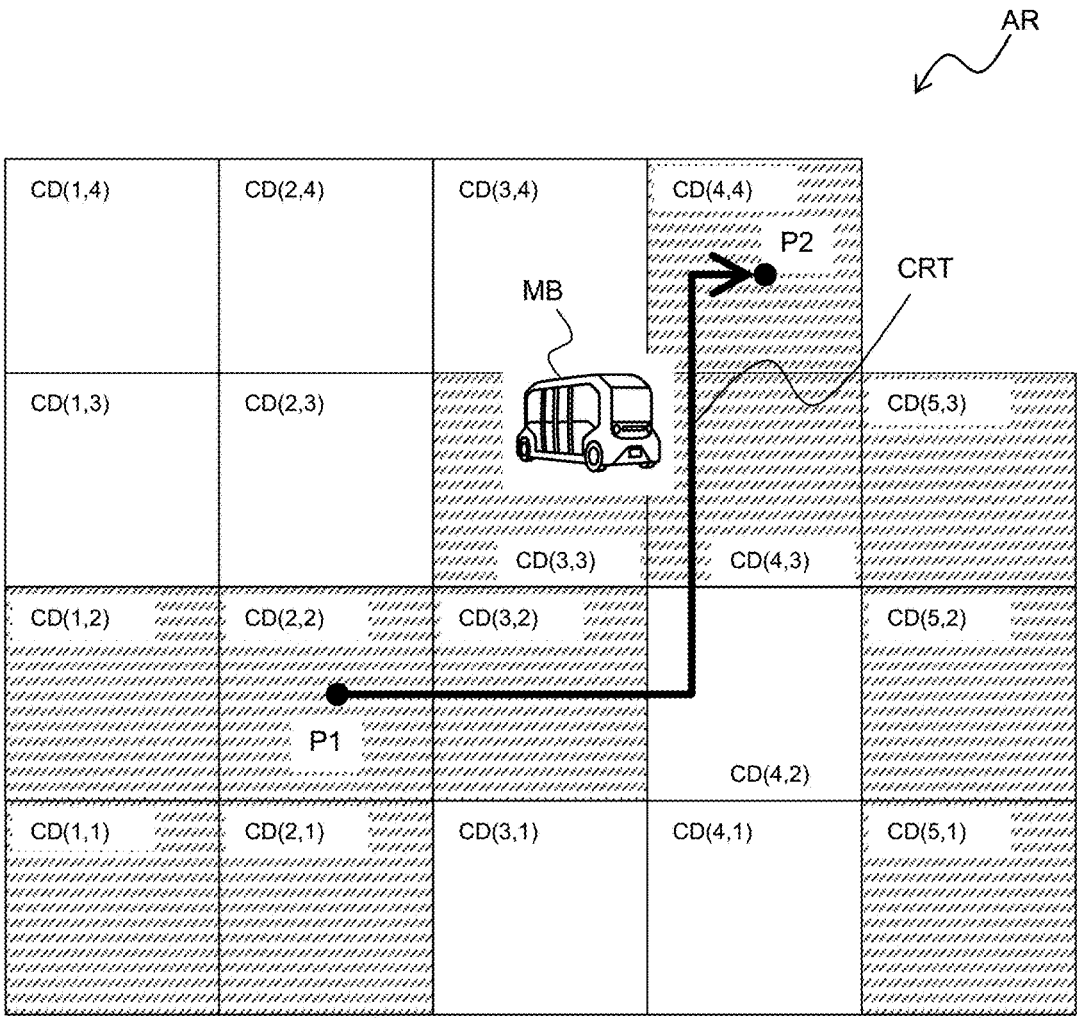
FIG. 3 is a diagram showing another example of the image output from the display of the terminal operated by the operator.
Figure 3:
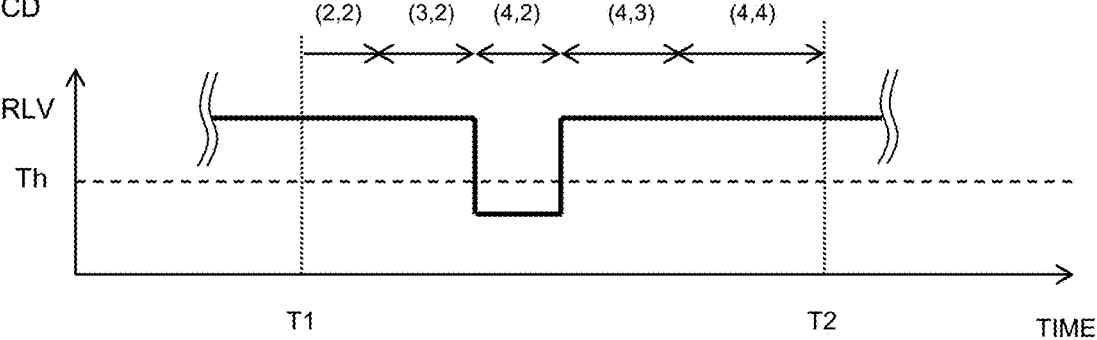
Figure 4:
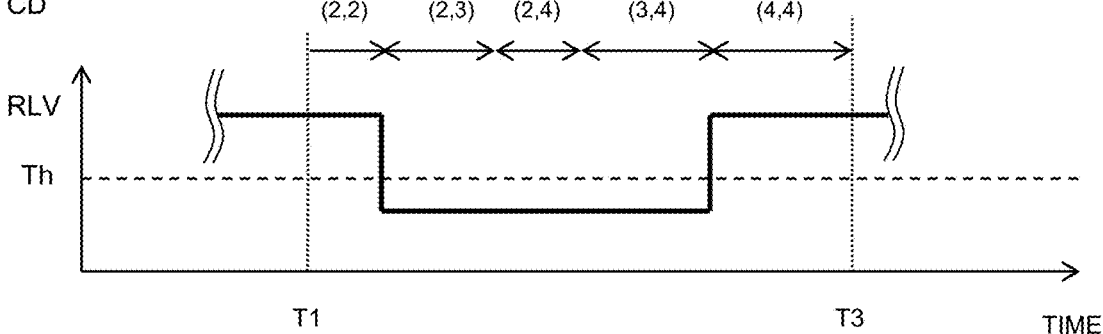
FIG. 4 is a diagram illustrating an example of an image displayed on a display when a first task is assigned to a mobile vehicle, in association with two types of states of the operator before the assignment.

FIGS. 3 and 4 are diagrams for explaining the avoidance route ART generated in the proposal processing. FIGS. 3 and 4 schematically show a map of an area AR including points P1 and P2. The point P1 is the current location of the mobile vehicle MB. The point P2 is the destination of the mobile vehicle MB. The time T1 shown at the bottom of FIGS. 3 and 4 is the current time. The times T2 and T3 are scheduled times at which the mobile vehicle MB will arrive at the destination point P2.

In FIG. 3, a current traveling route (hereinafter, also referred to as a "current route") CRT from the point P1 to the point P2 is drawn. On the other hand, FIG. 4 illustrates the avoidance route ART. The current route CRT and the avoidance route ART are roads on which the mobile vehicle MB can travel. The current route CRT and the avoidance route ART are roads for vehicles registered in a database of a general car navigation system.

In FIGS. 3 and 4, the area AR is divided into a plurality of zone CDs. In the examples shown in FIGS. 3 and 4, the area AR is divided into a mesh shape, and the occurrence level RLV is set for each of the zone CDs. At least two levels are set for the occurrence level RVL. When two occurrence level RVLs are set, the occurrence level RVL is configured by a level at which the frequency of the occurrence of the remote support is higher than a threshold Th and a level at which the frequency is lower than the threshold Th. As described above, the occurrence level RLV includes the occurrence levels RLV_A and RVL_D. Therefore, at least two levels are set for each of the occurrence levels RLV_A and RVL_D.

The current route CRT shown in FIG. 3 is the route passing through the zones CD (2, 2), CD (3, 2), CD (4, 3) and CD (4, 4) having a level higher than the threshold Th and the zone CD (4, 2) having a level lower than the threshold Th. In contrast, the avoidance route ART shown in FIG. 4 is a route that passes through the zones CD (2, 2) and CD (4, 4) having a level higher than the threshold Th and the zones CD (2, 3), CD (2, 4) and CD (3, 4) having a level lower than the threshold Th.

In the proposal processing, the avoidance route ART is generated based on the information on the points P1 and P2 and the information on the occurrence level RLV. The avoidance route ART is, for example, a route that travels the longest way or the longest time in the zone CDs having a level lower than the threshold Th among traveling routes from the points P1 to P2.

In the generation of the avoidance route ART, the information on the current route CRT may be used. The avoidance route ART may be, for example, a route in which a distance or time for traveling in the zone CDs having a level lower than the threshold Th is longer than the current route CRT. In another example, a traveling route that significantly exceeds the driving distance or the travel time along the current route CRT is excluded. The traveling route after the exclusion is the one that has the longest distance or time to travel in the zone CDs having a level lower than the threshold Th. Alternatively, the traveling route after the exclusion is a traveling route in which the distance or time for traveling in the zone CDs having a level lower than the threshold Th is longer than the current route CRT.

The generated avoidance route ART is sent to the mobile vehicle MB. It is needless to say that the mobile vehicle MB to which the avoidance route ART is sent is the one in which the communication with the management server MS is established (e.g., the mobile vehicle MB in operation). However, as described above, the mobile vehicle information MBL includes the information on the current provision status of the remote service. Therefore, it is desirable that the mobile vehicle MB to which the avoidance route ART is transmitted is selected with reference to the information on the provision status.

For example, from the aspect of increasing an acceptance probability of the avoidance route ART, it is desirable to send the avoidance route ART to the mobile vehicle MB with which the remote monitoring is provided. The mobile vehicle MB with which the remote assistance or the remote driving provided are the one that currently needs the remote support. Therefore, such a mobile vehicle MB may make a request for the remote assistance or the remote driving in the near future. In this regard, the mobile vehicle MB with which the remote monitoring is provided may not make a request for remote assistance or the remote driving. Therefore, by sending the avoidance route ART to the mobile vehicle MB with which the remote monitoring is provided, an increase in the probability of accepting the avoidance route ART is expected.

The generation of the avoidance route ART and the sending of the avoidance route ART to the mobile vehicle MB may be performed for the mobile vehicle MB of which the free space FSP is equal to or less than a lower limit capacity. The fact that the free space FSP is equal to or less than the lower limit capacity means that a situation is approaching in which the log information of the remote support that will occur in the future cannot be stored in the memory device of the mobile vehicle MB. Therefore, even when the processing load is less than the upper limit load and the data traffic per unit time is less than the upper limit amount, the avoidance route ART may be generated and sent when the free space FSP is equal to or less than the lower limit capacity. When the mobile vehicle MB receives and accepts the avoidance route ART, it is possible to avoid the above-described situation.

4. Processing Example by Management Server

Figure 5:
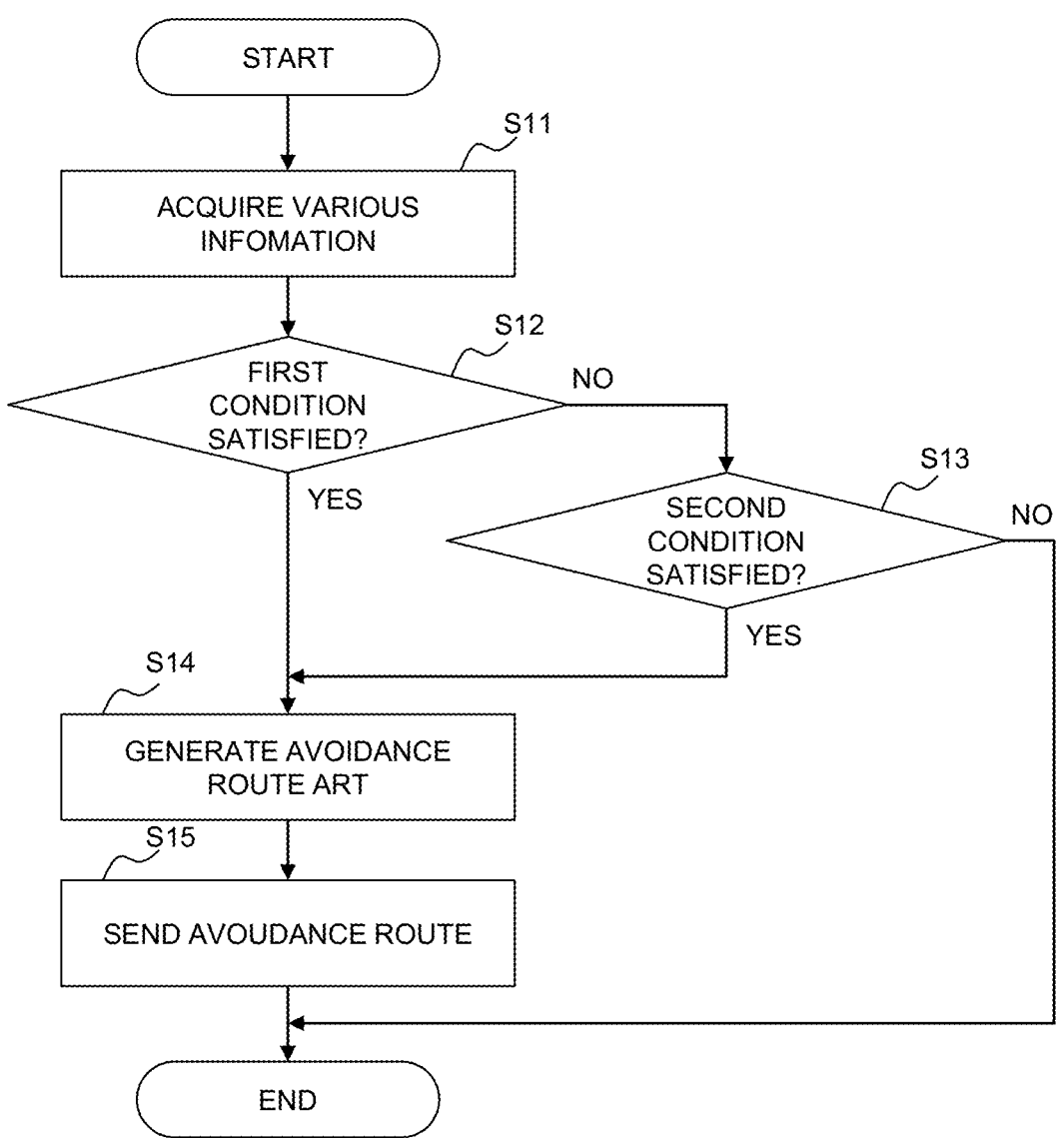
FIG. 5 is a block diagram showing an example of a function configuration of a processor of a management server particularly related to an embodiment of the present disclosure.

FIG. 5 is a flow chart illustrating a processing example, particularly relevant to the embodiment, that is performed by the management server MS (the processor 14$a$). The routine shown in FIG. 5 is repeatedly executed, for example, at a predetermined control cycle.

In the routine shown in FIG. 5, first, various information is acquired (step S11). The various information acquired in step S11 includes the mobile vehicle information MBL, the information on processing load of the processor 14$a$, and the data traffic per unit time in data sending/receiving between the mobile vehicle MB and the management server MS. The mobile vehicle information MBL is obtained from the management DB 12. The processing load of the processor 14$a$ is calculated from, for example, utilization rate of the processor 14$a$. The data traffic per unit time is data traffic of uplink (sending) or data traffic of downlink (reception) with reference to the management server MS. Since image information is transmitted from the mobile vehicle MB, the data traffic of downlink (reception) is usually larger than the data traffic of uplink (sending).

Subsequent to the processing of step S11, it is determined whether a first condition is satisfied (step S12). The first condition includes the following conditions (i) and (ii).

(i) The processing load of the processor 14$a$ is equal to or higher than the upper limit load.

(ii) The data traffic per unit time is greater than or equal to the upper limit amount.

Regarding the condition (I), the processing load of the processor 14$a$ may be an instantaneous value or an average of processing loads during a predetermined period (e.g., several seconds to several tens of seconds) from the present.

If at least one of the conditions (i) and (ii) is satisfied, it is determined that the first condition is satisfied. If it is determined that the first condition is satisfied, the processing of step S14 (described later) is executed. When it is determined that the first condition is not satisfied, it is determined whether a second condition is satisfied (step S13). The second condition includes the following condition (iii).

(iii) The free space FSP is less than or equal to the lower limit capacity.

When the condition (iii) is satisfied, it is determined that the second condition is satisfied. When it is determined that the second condition is satisfied, the processing of step S14 (described later) is executed. If it is determined that the second condition is not satisfied, the current process is terminated.

In the processing of step S14, the avoidance route ART is generated. An example of the generation of the avoidance route ART is as described in the description of FIGS. 3 and 4. At least one candidate of the avoidance route ART is generated. That is, two or more candidates of the avoidance route ART may be generated. In this case, the candidates may be different from each other in terms of a distance or time for which the zone CDs having a level lower than the threshold Th is traveled. Therefore, from among these candidates, one candidate that has the longest distance or time to travel through the zone CDs having a level lower than the threshold Th can be selected as the avoidance route ART.

Subsequent to the processing of step S14, the avoidance route ART is sent to the mobile vehicle MB (step S15). The mobile vehicle MB to which the avoidance route ART is sent differs between a case where the avoidance route ART is generated through the processing of step S12 and a case where the avoidance route ART is generated through the processing of step S13. That is, in the former case, a sending target of the avoidance route ART is the mobile vehicle MB with which the communication with the management server MS is established. However, as described above, it is desirable that the mobile vehicle MB to which the avoidance route RT is sent is selected by referring to the information of the current providing situation of the remote service. On the other hand, in the latter case, the mobile vehicle MB determined to satisfy the second condition in the processing of step S13 is the sending target of the avoidance route ART.

What is claimed is:

1. A method for providing a remote support for a plurality of mobile vehicles, the method comprising:

calculating a processing load of a server managing the remote support or data traffic per unit time in data sending/receiving between a target mobile vehicle of the remote support and the server;

acquiring positional information on a current location and a destination of the target mobile vehicle and map information containing the current location and the destination;

when the processing load is greater than or equal to an upper limit load or when the data traffic per unit time is greater than or equal to an upper limit amount, making a proposal to the target mobile vehicle for an avoidance route for avoiding an occurrence of the remote support based on the positional information and the map information; and controlling the target mobile vehicle to autonomously travel in accordance with the avoidance route, wherein:

the making the proposal for the avoidance route comprises:

generating the avoidance route at the server; and sending the avoidance route from the server to the target mobile vehicle;

the remote support includes a remote assistance and a remote driving of the target mobile vehicle, and the avoidance route is a route for avoiding an occurrence of at least one of the remote assistance and the remote driving, the method further comprising:

storing the map information including information on respective positions of roads, respective shapes of the roads, respective positions of intersections and constructions, information on an occurrence level of the remote support, the occurrence level corresponding to a frequency of occurrence of the remote support;

setting the occurrence level in advance by a prediction model for each zone formed by dividing the map and based on provision history of the remote support; and storing mobile vehicle information that includes information on a free space of a memory device of the target mobile vehicle including log information, the log information includes image information around the target mobile vehicle, a speed, an acceleration, and a steering angle of the target mobile vehicle sent from the target mobile vehicle to the server in response to occurrence of an event in which the target mobile vehicle is provided with the remote support, instruction information received by the target mobile vehicle from the server during the event in which the mobile vehicle is provided with the remote support, and control amount information of driving devices of the target mobile vehicle based on the instruction information.

2. The method according to claim 1, the method further comprising:

in response to the processing load being less than the upper limit load and the data traffic per unit time is less than the upper limit amount and in response to the free space being equal to or less than a lower limit capacity, making the proposal to the target mobile vehicle for the avoidance route.

3. A system for providing a remote support for a plurality of mobile vehicles, comprising:

a server for managing the remote support, wherein the server is configured to:

calculate a processing load of the server or data traffic per unit time in data sending/receiving between a target mobile vehicle of the remote support and the server;

acquire positional information on a current location and a destination of the target mobile vehicle and map information containing the current location and the destination;

make a proposal to the target mobile vehicle for an avoidance route for avoiding an occurrence of the remote support based on the positional information and the map information when the processing load is greater than or equal to an upper limit load or when the data traffic per unit time is greater than or equal to an upper limit amount; and controlling the target mobile vehicle to autonomously travel in accordance with the avoidance route, wherein the making the proposal for the avoidance route comprises:

generating the avoidance route at the server; and sending the avoidance route from the server to the target mobile vehicle;

the remote support includes a remote assistance and a remote driving of the target mobile vehicle, and the avoidance route is a route for avoiding an occurrence of at least one of the remote assistance and the remote driving, the server further configured to:

store the map information including information on respective positions of roads, respective shapes of the roads, respective positions of intersections and constructions, information on an occurrence level of the remote support, the occurrence level corresponding to a frequency of occurrence of the remote support;

set the occurrence level in advance by a prediction model for each zone formed by dividing the map and based on provision history of the remote support; and store mobile vehicle information that includes information on a free space of a memory device of the target mobile vehicle including log information, the log information includes image information around the target mobile vehicle, a speed, an acceleration, and a steering angle of the target mobile vehicle sent from the target mobile vehicle to the server in response to occurrence of an event in which the target mobile vehicle is provided with the remote support, instruction information received by the target mobile vehicle from the server during the event in which the mobile vehicle is provided with the remote support, and control amount information of driving devices of the target mobile vehicle based on the instruction information.

* * * * *